July 17, 1962  P. REBUT  3,044,497
TUBULAR MEMBERS PROVIDED WITH CORRUGATED WALLS
Filed June 8, 1959
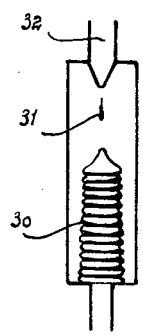
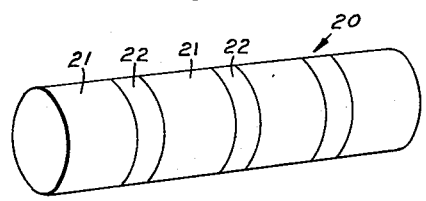
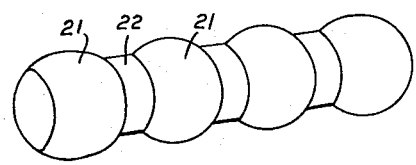
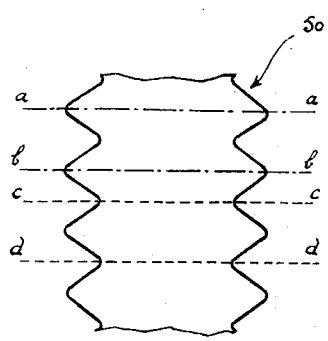
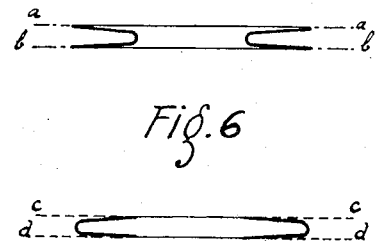
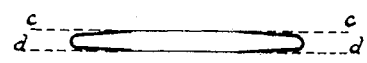
INVENTOR
PAUL REBUT
By Irwin S. Thompson
ATTY.

United States Patent Office 3,044,497
Patented July 17, 1962

3,044,497
TUBULAR MEMBERS PROVIDED WITH CORRUGATED WALLS
Paul Rebut, Tarare (Rhone), France, assignor to Societe Bodin, Girin & Cie, Tissus Industriels, Tarare (Rhone), France, a corporation of France
Filed June 8, 1959, Ser. No. 818,954
Claims priority, application France June 12, 1958
2 Claims. (Cl. 138—121)

My invention has for its object tubular members having corrugated walls.

The expression "corrugated wall" is intended to convey the meaning that the generating lines of the tubular members have a deformed undulating shape.

Various materials are known to which may be bestowed a permanent deformation upon subjection to a thermic treatment which will be defined hereinafter as a "fixing treatment."

The present invention covers more particularly tubular members having corrugated walls and provided, with reference to smooth walled tubes, with improved properties as to resistance against crushing and transverse rigidity, together with an increased ease of elongation and longitudinal bending.

The invention has also for its object the execution, starting from corrugated tubular members, of various products such as aortic prosthesis, filtering elements, reinforced tubes, packings, washers and the like. Tubular members according to the invention are particularly suitable for such applications.

My improved tubular members with corrugated walls consists chiefly in that a smooth-walled tubular member is produced through the weaving of a thermo-setting material, after which a series of corrugations is formed in the wall of the tubular member and the latter is finally subjected to a fixing treatment.

The features and advantages of the invention will appear readily upon reading of the following description of a number of embodiments of the method and of the product obtained, as illustrated by way of example in the accompanying diagrammatic drawings, wherein:

FIGS. 1 and 2 illustrate a tubular member according to the invention, respectively before and after heat treatment.

FIG. 3 shows a filter of the plug type starting from a tubular member according to the invention.

FIG. 4 shows a tubular member with a corrugated wall in longitudinal cross-sectional view.

FIGS. 5 and 6 show packings obtained with a member according to FIG. 4.

According to FIGS. 1 and 2 for executing tubular members with corrugated walls, chiefly for aortic prosthesis, a tube is woven, the smooth wall of which includes a succession of annular areas constituted by weft threads made of at least one thermo-shrinking material, the shrinking properties of said threads under the action of heat differing between the odd and even alternating areas. The controlled shrinking of said weft thread is provided by heating, so as to obtain a ringed appearance for the tube. A tubular member obtained in accordance with the invention is illustrated in FIGS. 1 and 2. Turning to FIG. 1, a woven tube 20 of which the warp is constituted by a thread of crimped polyacrylonitrile weighing 2×90 deniers is associated in succession and alternatingly with the same crimped thread to form an annular area 21 (eight successive shots) and with an ordinary 180 denier thread which is not shrunk to form an annular area 22 (four successive shots). The tubular member thus obtained is fitted over a tubular core and is heated at 100° C. therewith inside a kiln during 30 minutes, which produces a shrinking of the non-shrunk threads in the area 22. The woven tube is allowed to cool and its components become compressed with reference to each other, which leads to the production of a ringed appearance. The tube is then fixed by heating the tube again at 130° C. during 45 minutes and there is obtained thus a ringed elastic tube which is sufficiently rigid for it to be necessary to incurve it without any crushing (FIG. 2). But for obtaining a really ringed tube having elastic properties such as required for aortic surgical prosthesis, it is necessary that the tube is first compressed on the tubular core by a person to provide a ringed appearance before subjecting to the heat fixing treatment.

In the example described, it is possible to use, for the successive weft threads, threads obtained starting from a same material, say a polyacrylonitrile resin. It is obviously possible to resort to threads of a different nature for the weft, such as polyacrylonitrile and polyvinyl chloride, or the like.

The use of the tubes thus obtained is obviously not limited to aortic prosthesis and another interesting use of such tubular elements consists in the execution of tubular plug-shaped filters, which have the advantage over other filters of the same height of being capable of use without any reinforcement or support to serve in particular as gas filters, chiefly for air and for liquids; one of the ends of the tubular elements forming said filters may be closed through weaving in this type of application. Furthermore, it is also possible to execute batteries of tubular filters of the plug type operating from the inside towards the outside or reversely and also to insert said plugs in a direction opposed to their normal location, i.e. in a manner such that the closed end of the filter may serve as a supporting part. Such a filter is illustrated diagrammatically at 30 in FIG. 3 as applied to the filtration of a liquid poured out dropwise at 31 through the nozzle 32.

The tubular elements according to the invention allow also obtaining packings and washers, which is illustrated diagrammatically in FIGS. 4 to 6. According to said figures, a tubular element 50 is executed in accordance with the invention. To this end, a tubular fabric is woven, which includes warp threads of an inert material, such as polytetrafluorethylene associated with weft threads made alternatingly of polytetrafluorethylene and of non-shrunk polyacrylonitrile. After producing a shrinkage of the fabric, there is obtained a tube with a corrugated wall, similar to that of FIG. 4. It is possible to separate portions of the tube by cutting through the latter. For instance, the tube is cut along two transverse planes $aa$ and $bb$ or again along the planes $cc$ and $dd$ and the ringed structure of the tube allows, after crushing in an axial direction, of the portion thus cut out, obtaining washer or packing elements which are illustrated by way of example in FIGS. 5 and 6.

Said elements may be used in a particularly advantageous manner as packings and washers, by reason of the presence of polytetrafluorethylene which is suitably inserted in the weave, said polytetrafluorethylene showing, as well known in the art, remarkable properties as to resistance to chemical reagents, together with an excellent behaviour under the action of heat.

It is also possible to reinforce in accordance with a well-known treatment the threads of polytetrafluorethylene through a further incorporation of said material, which adheres to the threads.

It is also possible to resort to other materials for weaving, say asbestos threads, or again, it is possible to select a thread producing the shrinkage, with a view to making said thread disappear readily after shaping of the packing. For instance, it is possible to use a thread of polyvinyl chloride, the shrinking of which may be equal to 15%; the packing obtained is heated to 140° C., so as to produce thus a melting of the thread and the remaining traces of the latter, if any, are removed through a suitable solvent, such as acetone, trichlorethylene or the like.

Of course, the invention is by no means limited to the embodiment described and illustrated which has been disclosed solely by way of example. In particular, the material serving for the execution of the original tubular member may be selected within a very large range of materials and the shapes and sizes given to said tubular members may also vary according to the applications.

What I claim is:

1. A flexible tube having a permanent circular wall crimp obtained by heating, comprising a woven tubular member having a first series and a second series of annular areas, said second series containing pre-shrunk weft threads, each area in said first series being disposed between two areas in said second series, said annular areas comprising weft threads made of the same thermo-shrinking material, the weft threads of the annular areas in said first series having natural shrinking properties thereby containing higher shrinking ability under the action of heat than the weft threads in said second series which have undergone previous shrinking, whereby the crimp in the wall of said tube is obtained by the application of heat only to said tubular member.

2. A flexible tube having a permanent circular wall crimp obtained by heating comprising a woven tubular member woven from warp threads and weft threads of the same thermo-shrinking material, said tubular member having a first series and a second series of annular areas, said second series containing pre-shrunk weft threads, said warp threads being pre-shrunk, each annular area in said first series being disposed between two areas in said second series, the weft threads of the annular areas in said first series having natural shrinking properties thereby containing higher shrinking ability under the action of heat than the weft threads in said second series and said warp threads which have undergone previous shrinking, whereby the crimp in the wall of said tube is obtained by the application of heat only to said tubular member.

References Cited in the file of this patent

UNITED STATES PATENTS

| | | |
|---|---|---|
| 2,100,835 | Ciamberlin | Nov. 30, 1937 |
| 2,143,960 | Stalter et al. | Jan. 17, 1939 |
| 2,384,936 | Lilley et al. | Sept. 18, 1945 |
| 2,504,523 | Harris | Apr. 18, 1950 |
| 2,565,316 | Lucas et al. | Aug. 21, 1951 |
| 2,751,629 | Dick | June 26, 1951 |
| 2,836,181 | Tapp | May 27, 1958 |